Feb. 12, 1935.  A. B. WINCHELL  1,990,886
PHONOGRAPH
Filed Jan. 19, 1932   12 Sheets-Sheet 1

INVENTOR
Arthur B. Winchell
ATTORNEY Ira J. Adams

Feb. 12, 1935.  A. B. WINCHELL  1,990,886
PHONOGRAPH
Filed Jan. 19, 1932  12 Sheets-Sheet 2

INVENTOR
Arthur B. Winchell
BY HIS ATTORNEY Ira J Adams

Feb. 12, 1935.  A. B. WINCHELL  1,990,886
PHONOGRAPH
Filed Jan. 19, 1932   12 Sheets-Sheet 4

INVENTOR
Arthur B. Winchell
BY HIS ATTORNEY

Feb. 12, 1935.  A. B. WINCHELL  1,990,886
PHONOGRAPH
Filed Jan. 19, 1932   12 Sheets-Sheet 5

INVENTOR
Arthur B. Winchell
BY HIS ATTORNEY

Feb. 12, 1935.  A. B. WINCHELL  1,990,886
PHONOGRAPH
Filed Jan. 19, 1932  12 Sheets-Sheet 6
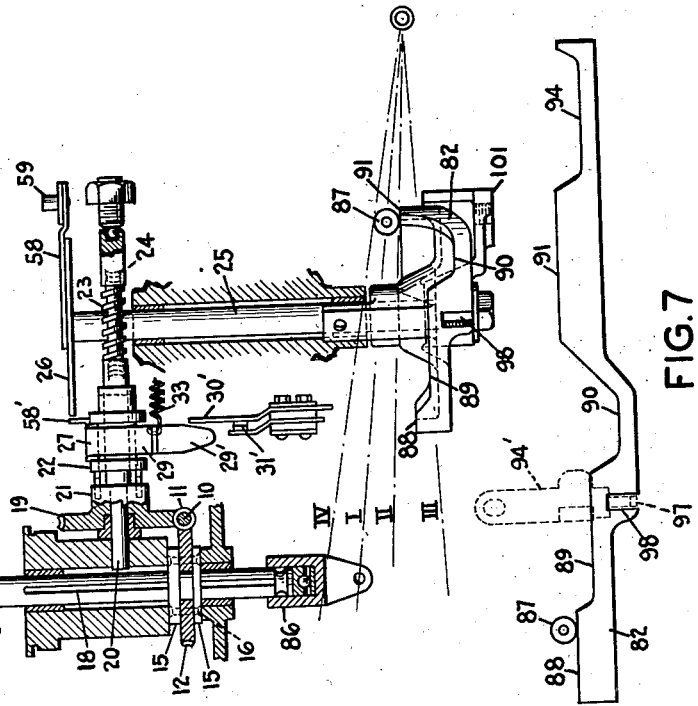
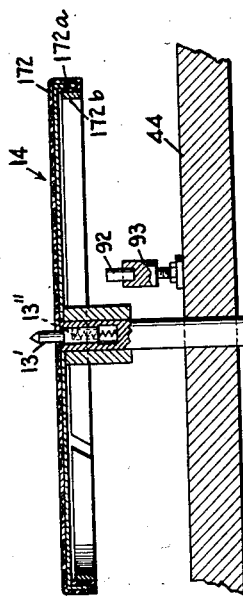
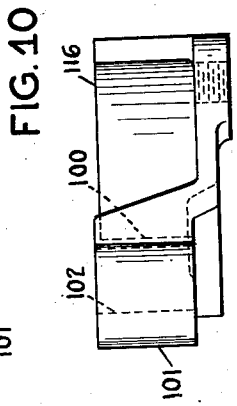
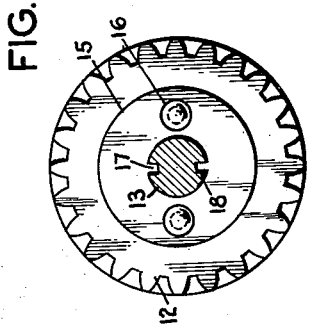
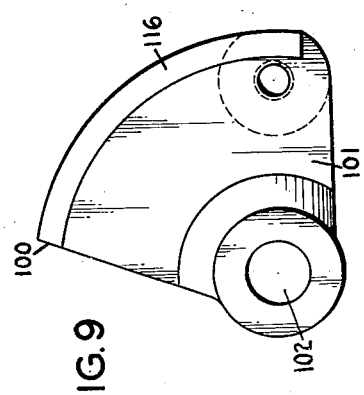
INVENTOR
Arthur B. Winchell
BY HIS ATTORNEY

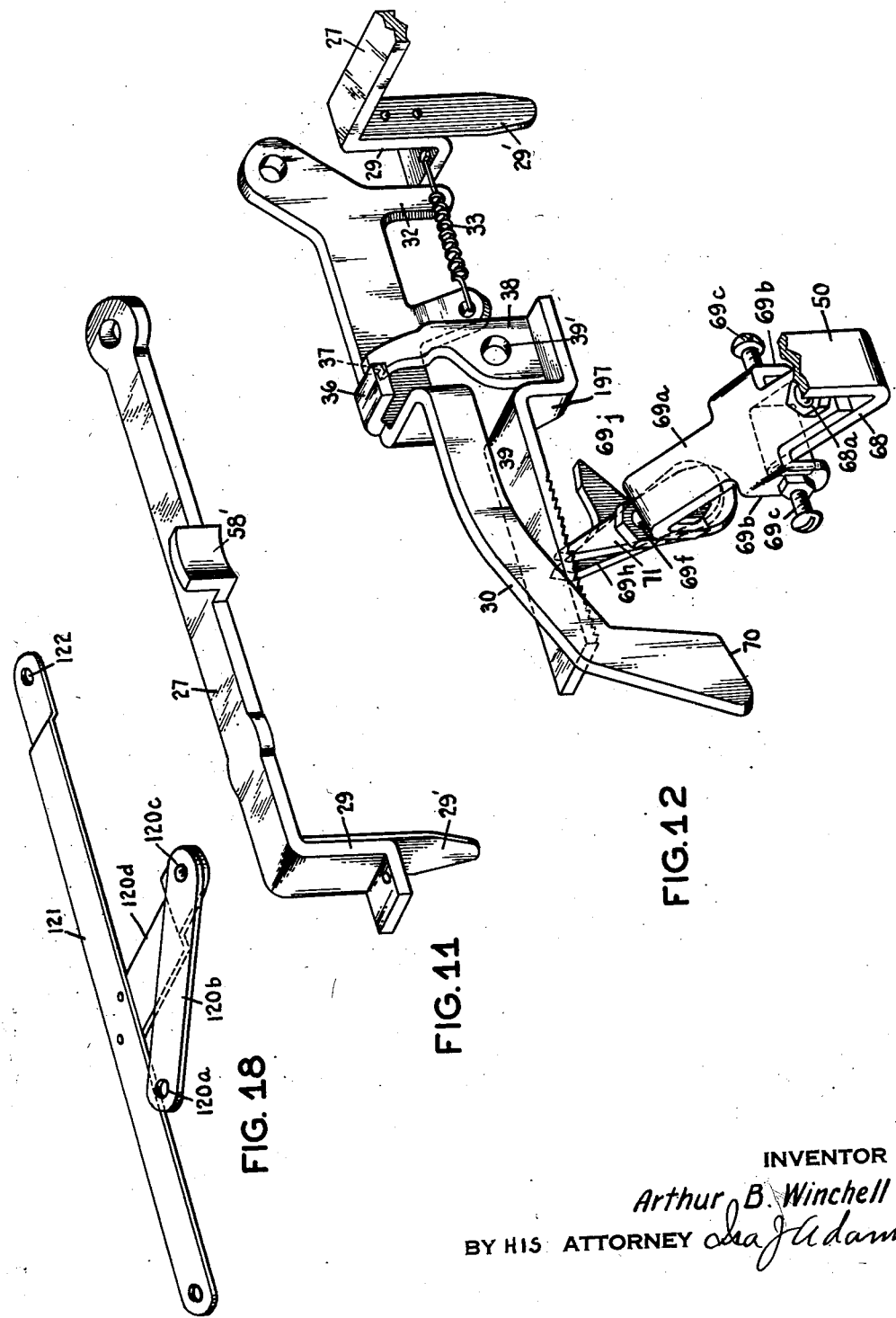

Feb. 12, 1935.  A. B. WINCHELL  1,990,886
PHONOGRAPH
Filed Jan. 19, 1932   12 Sheets-Sheet 8
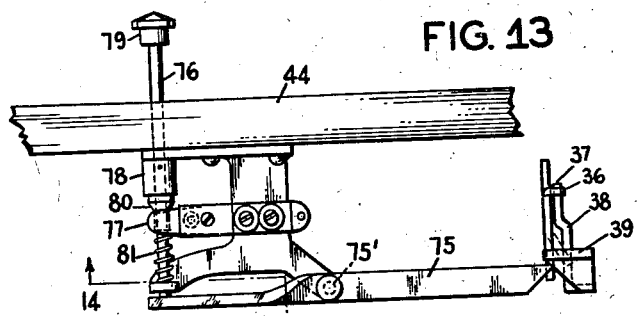
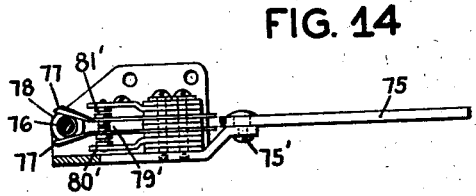
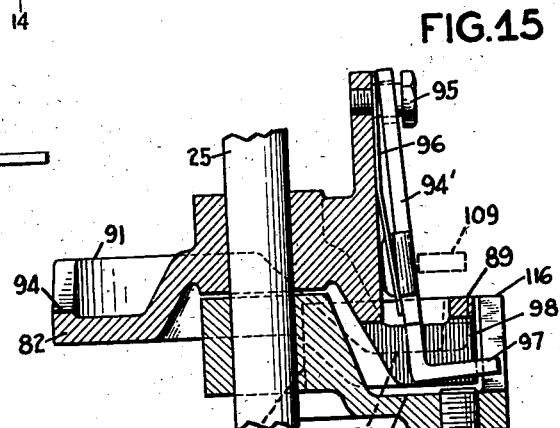
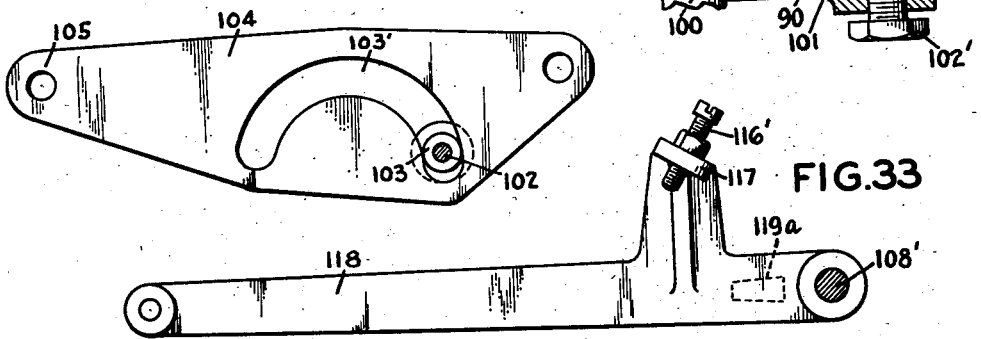
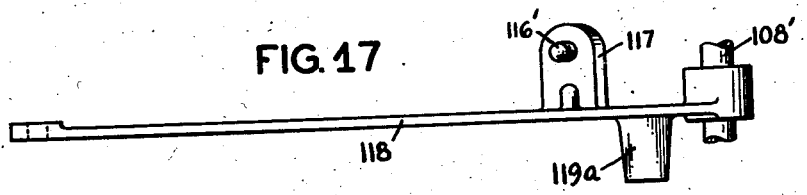
INVENTOR
Arthur B. Winchell
BY HIS ATTORNEY

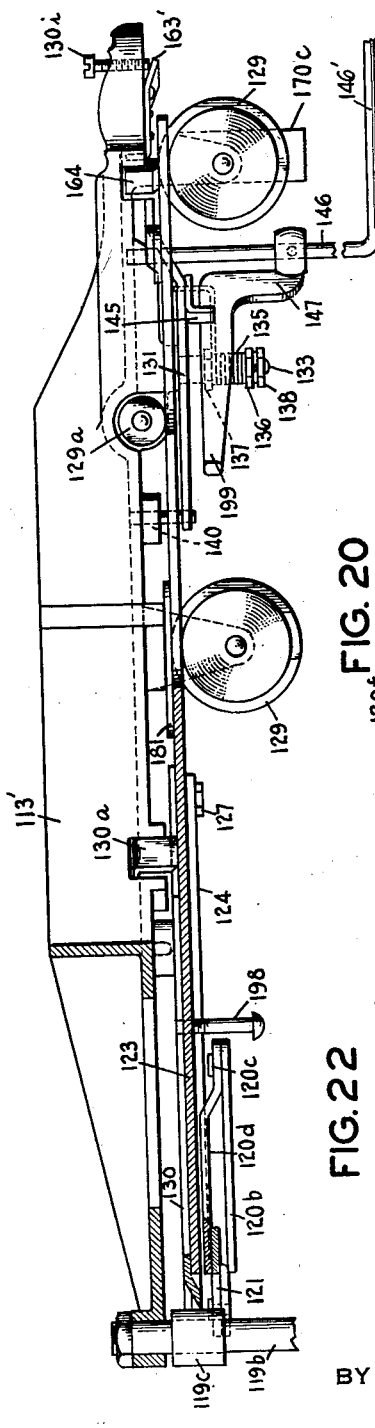
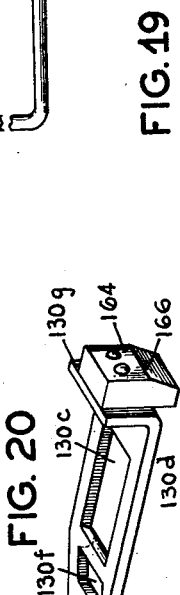
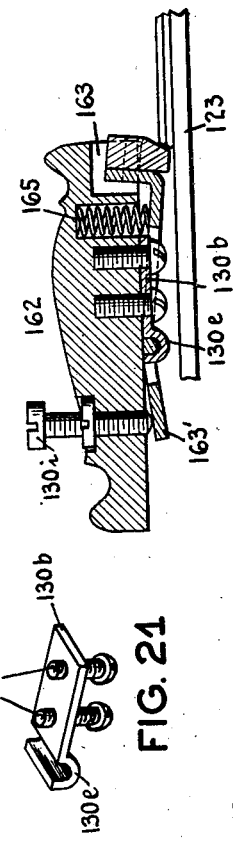
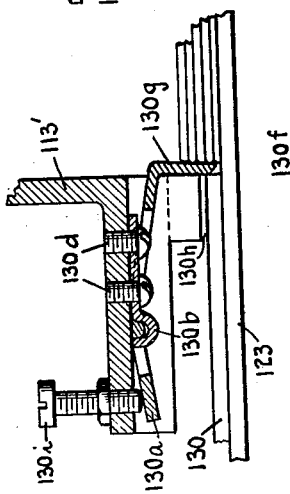
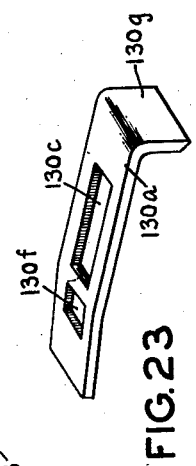

Feb. 12, 1935. A. B. WINCHELL 1,990,886
PHONOGRAPH
Filed Jan. 19, 1932 12 Sheets-Sheet 10
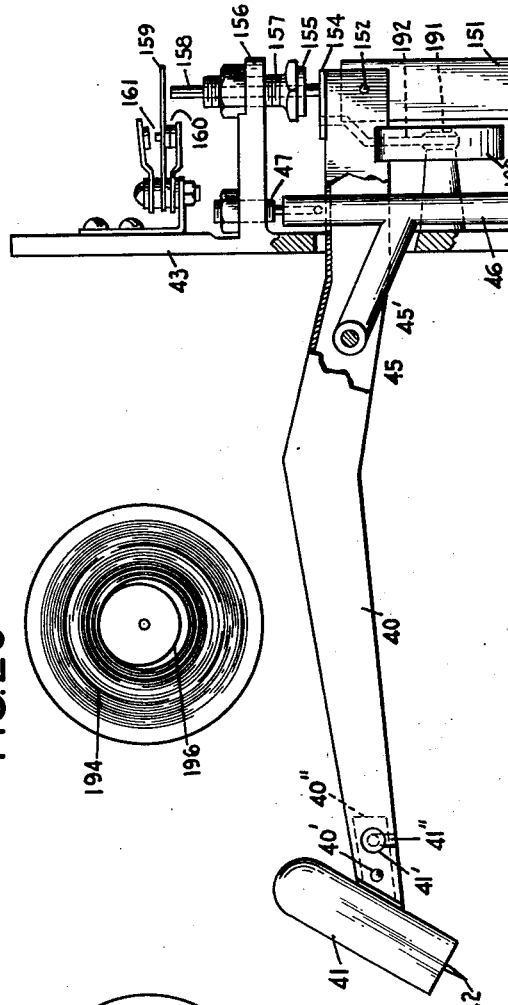
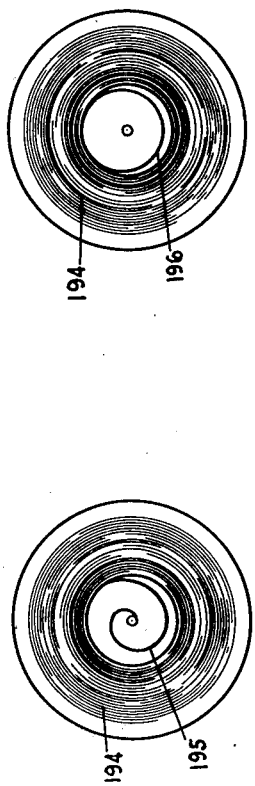
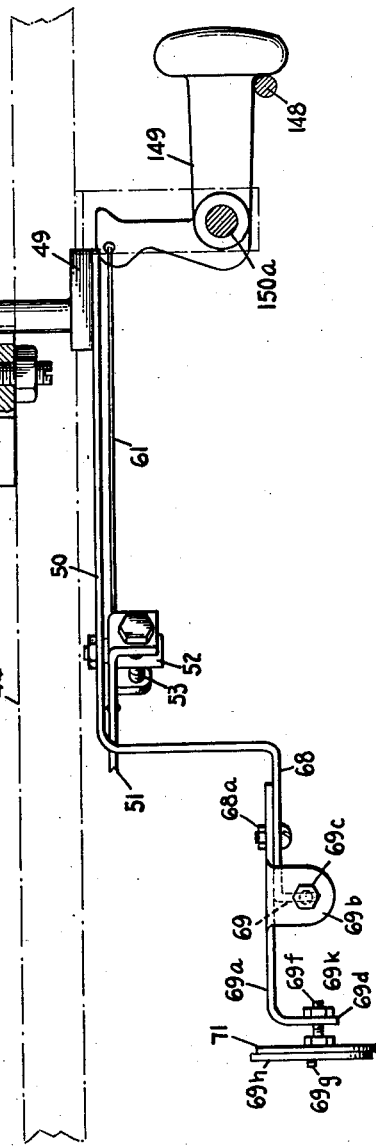
INVENTOR
Arthur B. Winchell
BY HIS ATTORNEY Feb. 12, 1935.   A. B. WINCHELL   1,990,886
PHONOGRAPH
Filed Jan. 19, 1932    12 Sheets-Sheet 11

INVENTOR
Arthur B. Winchell
BY HIS ATTORNEY Ira J. Adams

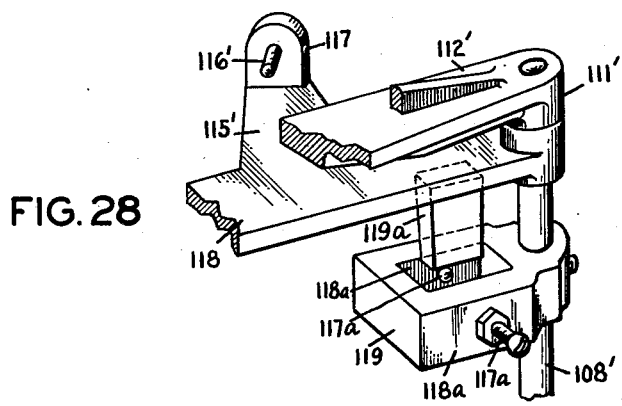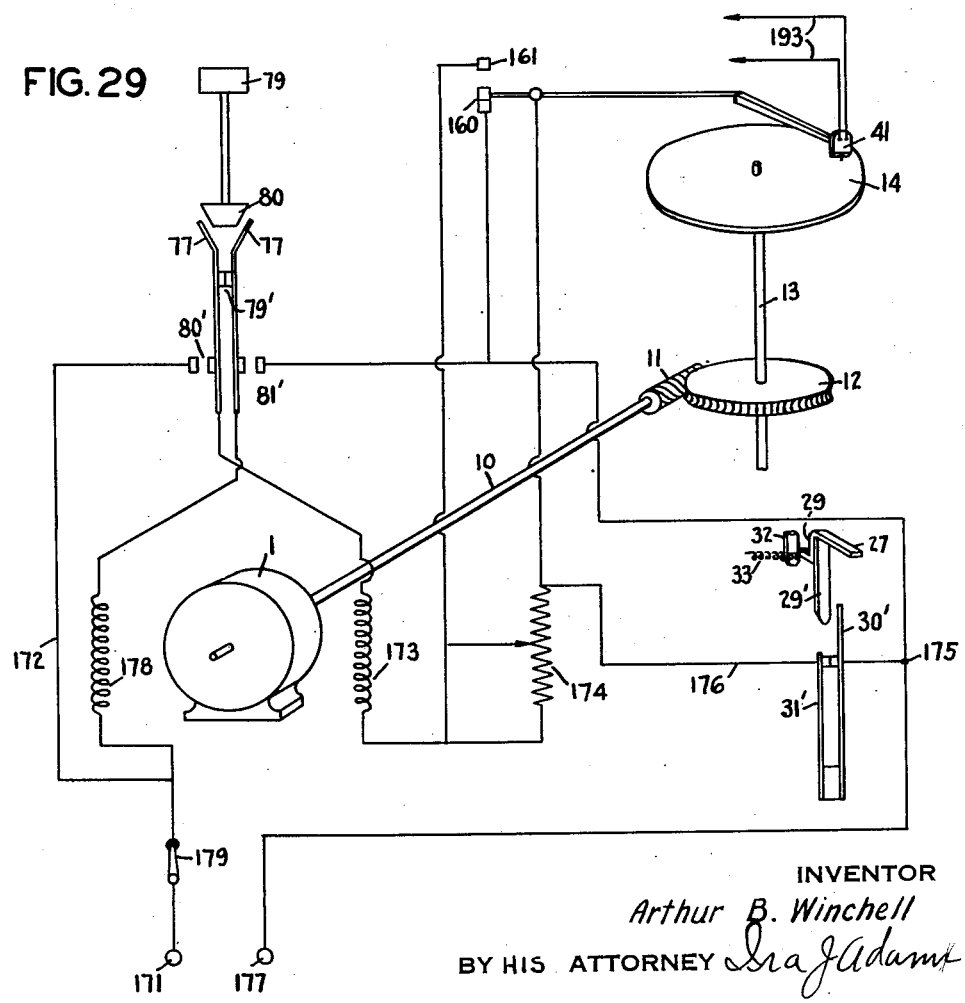

Patented Feb. 12, 1935

1,990,886

UNITED STATES PATENT OFFICE 1,990,886

PHONOGRAPH

Arthur B. Winchell, Jackson, Mich., assignor, by mesne assignments, to Radio Corporation of America, New York, N. Y., a corporation of Delaware Application January 19, 1932, Serial No. 587,486

15 Claims. (Cl. 274—10)

This invention relates to electric phonographs and is a continuation in part of my application Serial No. 447,480, filed April 26, 1930.

An object of the invention is to provide for an improved mechanism for adjusting the pickup arm for playing either large or small size records.

Another object is to provide admitter pawls to admit only one record to the slide as it travels over the turntable.

Another object is to mount the slide wholly between rollers to reduce friction.

Another object is to construct a double pawl for the pickup arm for discarding the records.

Another object is to provide for adjustment of the pawl carrying arm of the pickup.

Another object is to provide an improved arrangement for bringing the repeat mechanism into operation.

Another object is to provide an improved adjustment for raising the table.

Another object is to provide pawls at the back of the hopper to prevent the records from wedging between the slide and hopper casting.

Another object is to provide a chassis arrangement that contains all the parts and which can be readily moved from the cabinet without disarranging the mechanism of the chassis.

Another object is to provide an improved discard hopper in which the records lie at a small angle from the horizontal.

Another object is to construct the hopper support so that it acts as a positive stop for the slide in retracted position.

Another object is to construct the turntable so that the felt cover may be more readily inserted or removed.

Other objects will appear in the following description, reference being had to the drawings in which:

Fig. 6 is a section of the turntable and gears illustrating the operation of the cam.

Fig. 7 is a development of the cam.

Fig. 8 is a plan of the worm gear, the shaft being in section.

Fig. 9 is a plan of the driving arm.

Fig. 10 is an elevation of the driving arm.

Fig. 11 is a perspective view of the clutch arm.

Fig. 12 is a perspective view of the throw-out lever, trip and related parts.

Fig. 13 is an elevation of the starting switch.

Fig. 14 is a plan of the starting switch.

Fig. 15 is an elevation of the cam and related parts.

Fig. 16 is a plan of the driving arm lever.

Fig. 17 is an elevation of the top lever.

Fig. 18 is a perspective view of the transverse lever.

Fig. 19 is a section showing the admitter and related parts.

Fig. 20 is a perspective view of the admitter.

Fig. 21 is a perspective view of the admitter hinge clamp.

Fig. 22 is a section showing the back pawl and related parts, certain parts being shown in section.

Fig. 23 is a perspective view of the back pawl.

Fig. 24 is an elevation of the pickup arm and related parts.

Fig. 25 is a plan view of a record with spiral trip groove.

Fig. 26 is a plan view of a record with an eccentric trip groove.

Fig. 28 is a perspective view of a portion of the top lever and the driving yoke.

Fig. 29 is a diagram of the electrical circuit.

Fig. 33 is a plan view of the top lever.

Fig. 34 is a cross section view of the hopper and slide in line 34—34 of Fig. 3.

Figure 1:
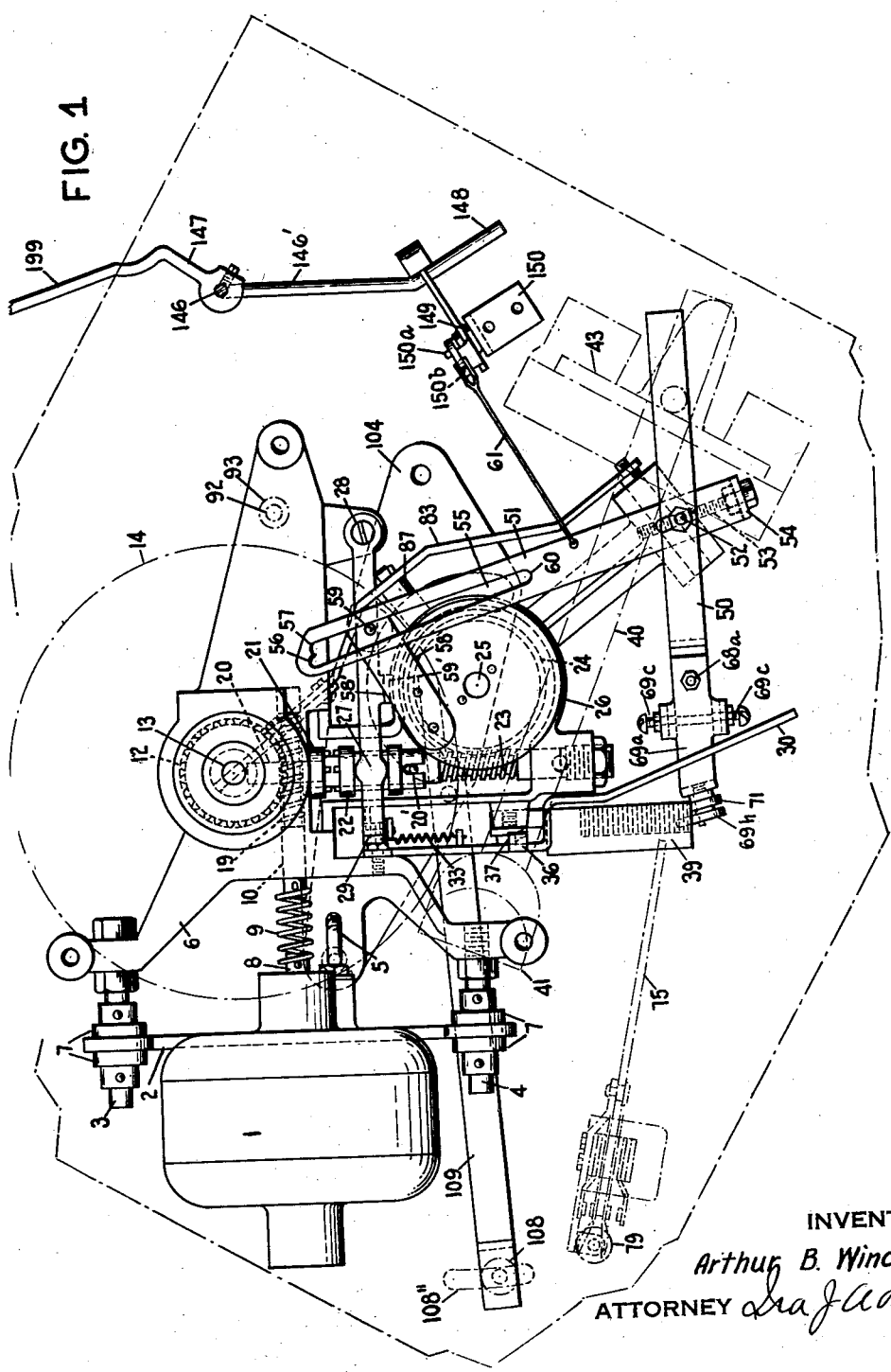
Fig. 1 is a plan view of the phonograph mechanism, certain parts being removed.

Except for the improved features previously mentioned the phonograph is the same as disclosed in my application referred to.

The phonograph may be operated by any type of motor but I have shown an electric motor 1 (Fig. 1) of the squirrel cage induction type. This motor is supported by means of a bracket 2 on studs 3, 4 and 5 secured in the arm of casting 6. Rubber bushings 7 act as cushioning means to prevent the vibrations of the motor being transmitted to the supporting bracket.

The motor armature shaft 8 is flexibly connected by spring 9 with the worm shaft 10 having worm 11 (Fig. 6) which meshes with worm gear 12 on shaft 13. The worm gear 12 itself slidably fits shaft 13 secured to turntable 14 but this gear has drive disks 15 (Fig. 8) secured to it on each side by means of screws 16 which disks have splines 17 fitting into keyway 18 in the shaft. This permits the shaft to be raised and lowered into various positions while being positively rotated by means of the gear 12.

The worm 11 on the drive shaft 10 also meshes with worm wheel 19 rotatably journalled on shaft 20. This gear 19 has a clutch member 21 having teeth adapted to engage with similar teeth on clutch member 22 slidably and non-rotatably secured to shaft 20 by a pin and slot arrangement 20' shown clearly in Fig. 1.

The shaft 13 has a pin 13' slidably arranged therein and spring 13" urges the pin upward in Fig. 6. This permits the pin to yield if the record should improperly engage it in the changing of records.

The shaft 20 has a worm 23 meshing with worm gear 24, shown in dotted lines in Fig. 6, secured to vertical key shaft 25 keyed or otherwise secured to index disk 26. From the foregoing it will be seen that the electric motor 1 rotates the turntable shaft 13 whenever the armature rotates and that it rotates the index disk 26 only when the clutch 21, 22, is in position.

The clutch 21, 22, is thrown into and out of engagement by clutch lever 27 pivoted to the main casting at 28 and fitting in between the flanges on clutch member 22. This clutch member has a depending portion 29 fastened to a lug 32 of throw-out lever 30 by means of a spring 33. The clutch lever 27 is thus pulled to the inoperative position by throw-out lever 30 through this spring 33, but the clutch lever is thrown into the operative position by projection 32 (Fig. 12) on the lever 30 when that lever turns about its pivot. When the clutch lever is in the "off" position projection 29' on lever 27 engages switch arm 30' and opens switch 31' (Fig. 6).

Throw-out lever 30 (Fig. 12) has a projection 36 adapted, in the playing position of the record, to rest in notch 37, in projection 38 extending at right angles to trip lever 39 pivoted in the main casting at 39'. So long as projecting 36 rests in notch 37 the spring 33 tends to maintain the clutch lever 27 in position to hold the clutch 21 and 22 in the off position.

The pickup arm 40 (Fig. 24) is pivoted at 45 to projection 45' of post member 46 which itself is pivoted at 47 and 48 in bracket 43 secured to platform or panelboard 44 to which also the main casting already referred to is secured. The pickup arm post 46 has a foot 49 secured to pickup lever arm 50 (Figs. 1 and 24). The connection between the arm 40 and lever 50 is rigid so that they must move together as the post 46 swings about the pivot bearings 47 and 48.

The pickup arm 40 has a pickup 41 pivoted thereto at 40'. The pickup has a projection 40" in which is threaded jam screw 41' entering a slot 41" in the pickup arm. By loosening the jam screw 41' the pickup may be rotated clockwise about the pivot point 40' in Fig. 24 and the needle 42 can be easily inserted, after which the pickup may be rotated back again and clamped in position by screwing down the jam screw.

Figure 4:
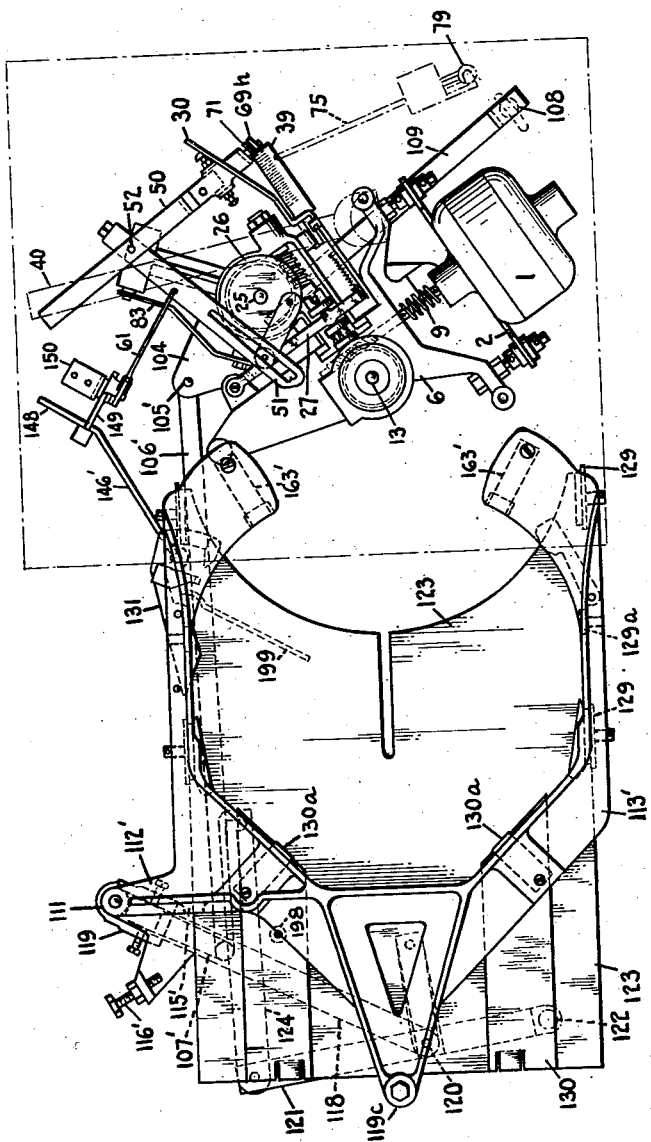
Fig. 4 is a plan view of the hopper joined to the motor mechanism shown in Fig. 1.

Index lever 51 is pivoted at 52 to the pickup lever 50 (Figs. 1 and 4). The pivot point 52 is adjustable in lever 51 by means of adjusting stud 53 secured to the downturned end 54 of the index lever 51 and threaded into pivot 52. This adjustment need only be made at the factory when the machine is assembled and the locknut will hold the adjustment.

Index lever 51 (Fig. 1) is slotted at 55 in such a way that the slot terminates at notch 56 at the left side and at notch 57 at the right hand side. On index disk 26 is fastened an arm 58 having stud 59 fitting into slot 55. As disk 26 rotates stud 59 will slide the lever 51 and rotate pickup arm 50 about pivot point 52 only when it engages the end 60, or the notches 56 and 57 of the slot 55. At other times the rotation of the disk 26 will merely oscillate the arm 51 about the pivot point 52. In the unclutched position projection 58' on the clutch lever locks the disk 26 by fitting into notch 59' therein.

In order to provide for the proper positioning of the needle for playing either 10 inch or 12 inch records the stud 59 is arranged in slot 55 so that it will normally contact with notch 57 in the last quarter of its revolution and pull the pickup arm back to position for correctly starting a 10-inch record. The manner in which the stud is carried to enter either the "small" or "large" slot will be described later.

A short arm 69a is pivoted at 68a to the horizontal portion 68 of pickup lever 50. The short arm has two down turned ears 69b (one only being visible in Fig. 24) and a screw 69c is threaded through each of these ears to abut against opposite sides of the down turned end 69 on pickup lever 50. By adjusting these screws the short arm may be turned on its pivot 68a and the end 69d adjusted in respect to the arm 50 and the pickup arm 40. In the down turned end 69d is threaded a headed screw 69f. The head of this screw has an eccentric pin 69g on which is pivoted two trip dogs 69h and 71, the dog 69h having a slightly shorter pawl end as shown. The outside dog 71 has a projecting arm 69j (Fig. 12). The purpose of these dogs will later be referred to. By loosening lock nut 69k the screw 69f may be rotated and the elevation of the dogs varied after which the lock nut will retain the adjustment. When throw-out lever 30 (Fig. 12) has been tripped, as later described, the pick-up lever arm 50 will be swung outwardly until projection 70 of the throw-out lever rides up on the short arm 69a and rests the catch 36 in the notch 37 referred to in detail when describing the operation of the phonograph.

In addition to providing for the tripping of the lever 39 by the dogs 69h and 71 at the end of the record, provision is also made for tripping this lever manually whenever the user desires to discard the record. Such means is shown in Figs. 1 and 13 and consists of a lever arm 75 pivoted at 75'. One end of the lever arm 75 extends beneath the trip lever 39 and the other end is adapted to be engaged by starting switch plunger 76 passing through the platform or panel board 44. Strips 77 constituting this switch are operated by insulation cone 80 on tube 78 secured to plunger 76. The dropping of trip lever 39 by pressure on button 79 brings about the closing of the clutch and permits switch 31' to close the motor circuit through the resistance 174 and through the motor coils in series. Pressure on button 79 opens series switch 79' and closes shunt switches 80' and 81' slightly before or simultaneously with the tripping of lever 39. This causes the motor to start with the coils in parallel to produce maximum torque as soon as clutch switch 30' is closed by movement of clutch lever projection 29' which is operated by the projection 32 on throwout lever 30 (Figs. 12 and 29). When pressure on button 79 is released spring 81 brings the plunger and connected parts back to normal position shown in Fig. 13, thus closing switch 79' and opening switches 80' and 81'. This puts the motor in normal running condition with the coils in series.

At the lower end of shaft 25 (Figs. 2 and 6) is secured a cam 82 shown in development in Fig. 7. This cam brings about the raising and lowering of the turntable when records are being changed or repeated. For this purpose lift lever 83 is pivoted in extension 85 of the casting. The other end of this lever 83 is pivoted in thrust bearing 86 in which rests turntable shaft 13. Lift lever 83 has roller 87 pivoted between its ends and resting upon the cam surfaces 88, 89, 90 or 91 (Figs. 6 and 7). The lever and other parts are omitted in Fig. 6 in order to show additional parts of the apparatus. The roller 87, however, is shown in Fig. 6. When roller 87 engages cam surface 88 the turntable is supported at position I, which is the playing position. When the cam rotates counter-clockwise, as viewed from the bottom of Fig. 6, roller 87 descends to surface 89 and brings the turntable to position II. In this position the turntable has been lowered below the needle of the pick-up arm so that the latter can be swung to the swing-back position.

As the cam continues to rotate roller 87 descends to the lowest cam surface 90. This brings the turntable to position III in which position the record on the turntable has been brought into engagement with the rubber 92 of the discard post 93 and the record is discarded in the way to be described later. As the cam continues to rotate roller 87 is raised to the highest surface 91 and the turntable is raised to position IV which is the position for receiving a record from the hopper slide referred to later. As the cam further rotates roller 87 descends to surface 94 which is at the same elevation as surface 89. In this position the pickup and needle is swung back into position over, but out of contact with, the new record that is now resting on the turntable. As the cam completes one revolution roller 87 is raised to surface 88 and the turntable is brought back to position I. As it is brought back to this position the record engages the needle in the pickup arm and the playing of the record commences. This movement also closes switch 160 and opens switch 161 on the pickup arm (Fig. 24). Soon thereafter projection 58' snaps into notch 59', the clutch is disengaged and the clutch switch is opened by projection 29' engaging spring arm 30' (Fig. 6).

The cam 82 thus makes one complete revolution during each change of the record or during the repeating operation. When the cam has made one complete revolution clutch members 21 and 22 are disengaged and further rotation stops, which will be more clearly understood when the operation of the apparatus is described in detail.

Figure 2:
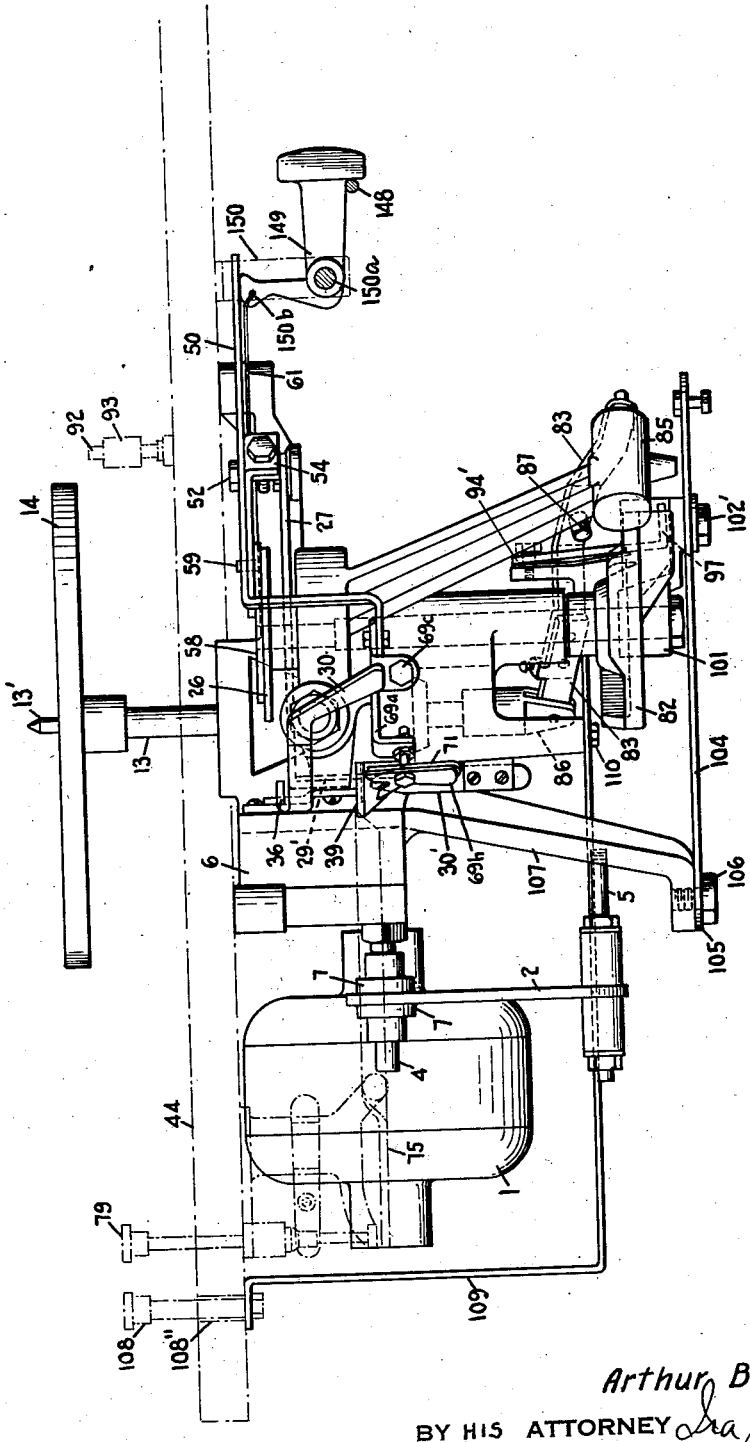
Fig. 2 is an elevation of the device shown in Fig. 1.

Referring to Figs. 2 and 15, cam 82 has a repeat dog 94' fastened to it by screw 95 with spring 96 arranged to urge the dog to the right in Fig. 15. At the lower end of the dog 94' is a projection 97 bent at substantially right angles to the main body of the dog which extends through the slot 98 in the cam and into position to engage the surface 100 of drive arm 101 illustrated in Figs. 10 and 15. This arm is positioned on shaft 25 so that such shaft freely rotated in its central hole 102 unless projection 97 on the dog 94' engages surface 100. When this engagement takes place the arm 101 is forced to rotate with the shaft and cam.

Driving arm 101 has a stud 102' passing through a roller 103 in arcuate slot 103' in driving arm 104 in plan in Fig. 16. This driving arm has its end 105 pivoted by stud 106 to projection 107 of the casting. The slot 103' is generated from a circle having its center in the center of the shaft 25 when the slide is at rest and the record is in playing position. When the arm 101 first starts to rotate it engages one side of the slot and moves the arm 104 out during somewhat less than a quarter of a revolution of the shaft. The next quarter, or somewhat less than a quarter of a revolution, of arm 101 moves the arm 104 in the reverse direction and during substantially the last half of the revolution the shaft 25 is located at the center if the arc and the roller moves along the arc without moving arm 104. These series of operations permit the slide to move the record over the turntable and to return to idle position before the turntable completes the last half of its cycle.

Repeat button 108 in slot 108'' of platform 44 is secured to shift lever 109 pivoted at 110 to a projection of the main casting (Fig. 2). The short end of the shift lever in normal playing position is out of engagement with repeat dog 94' and the projection 97 of the dog engages the wall 100 (Fig. 10) of the driving arm 101 pivoted concentrically with the cam 92 on the shaft 25. The cam 82 is pinned or otherwise secured to this shaft while the driving arm 101 is loosely journalled thereon. When the repeat lever is shifted from normal to "repeat" position, the driving dog 94' is moved against the tension of spring 96 to the left until projection 97 on the dog clears wall 100 of the driving arm 101. As the cam rotates, the driving arm 101 will remain stationary because it is no longer connected thereto by the dog 94'. Therefore, the driving arm 104 and the hopper slide will not be operated to place a record on the turntable. As the cam 82 rotates in the way previously described roller 87 can descend no lower than the swing-back position 11 of Fig. 6 because the driving arm 101 is now stationary and the roller rests on the arcuate surface 116 of the driving arm (Fig. 9). This prevents the lift lever 83 from lowering the record into contact with the rubber 92 of the discard post 93. All operations will therefore be repeated except that the record will not be discarded and a new record will not be placed on the turntable. The cam 82, the pick-up arm and the pick-up lever will go through the movement previously described and when the playing again starts it will be from the same record instead of from a new one.

Figure 30:
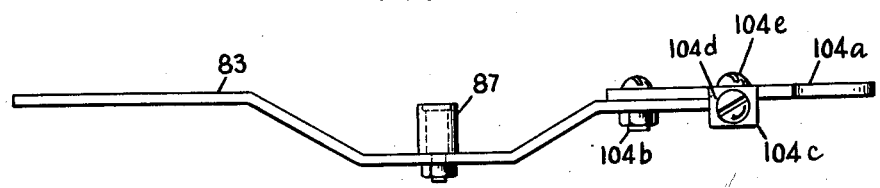
Fig. 30 is a plan of the turntable lift lever.
Figure 31:
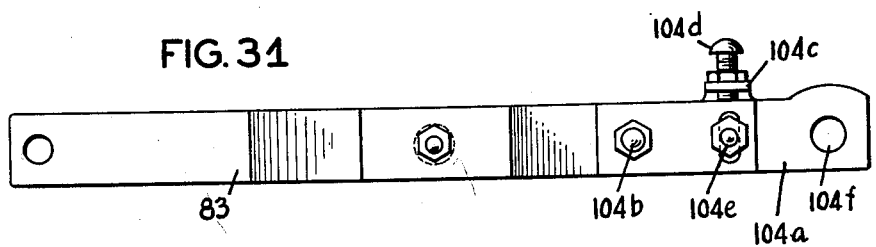
Fig. 31 is an elevation of the turntable lift lever.

The lift lever 83 is shown in detail in Figs. 30 and 31. The end of the lever has an adjustable end piece 104a pivoted to the lift lever by bolt 104b. The end piece has a turned-over ear 104c in which is threaded an adjusting screw 104d contacting with the edge of the lift lever. A locking bolt 104e passes through a hole in the end piece and through a slot in the lift lever. This bolt 104e retains the adjustment when once made. A lock nut may be used on the screw 104d. The adjustment of the end piece permits one to adjust the elevation of the turntable, the shaft of which is connected to the thrust bearing 86 pivoted in the hole 104f.

Driving arm 104 (Figs. 4 and 5) is secured by stud 105' to one end of link 106', the other end of which is connected to arm 107' pinned to vertical shaft 108'. This shaft passes through bearing member 109' fastened to the bottom of the hopper and the other end is journalled at 111' in arm 112' forming an integral part of the hopper casting 113'. A collar 114' is clamped on the shaft 108' by a set screw so as to rest on the bearing 109' and thus hold the shaft from downward movement. This bearing has a bushing 109'' of spherical shape to constitute a universal bearing. This prevents binding in the bearing if the shaft is somewhat out of line. The shaft is prevented from moving upward in Fig. 5 by means of yoke 119 on the upper end of the shaft which engages the top lever 118 which in turn bears against the side of the bearing 111' in the arm 112' of the hopper casting 113'. This arm has a boss 115' against which bears adjusting stud (Fig. 28) 116' threaded through projection 117 integrally joined to the top lever 118 which is loosely positioned on the shaft 108'. The adjusting screw 116' is a limiting device to locate the extreme movement of the slide 123 in the forward position by contacting with boss 115'. If it were not for this screw there might be enough play in the driving arm and link mechanism to cause the slide to overrun slightly in locating the record over the turntable. The slide is prevented from overrunning in the opposite position by contacting with the shaft 119b supporting the rear of the casting 113'. Preferably I place a soft rubber ring 119c on the shaft to furnish a resilient stop.

The yoke 119 is keyed to shaft 108' and has set screws 117a in its sides 118a which engage the lug 119a on the bottom of the top lever 118. This permits adjustment between the shaft and the top lever.

Figure 3:
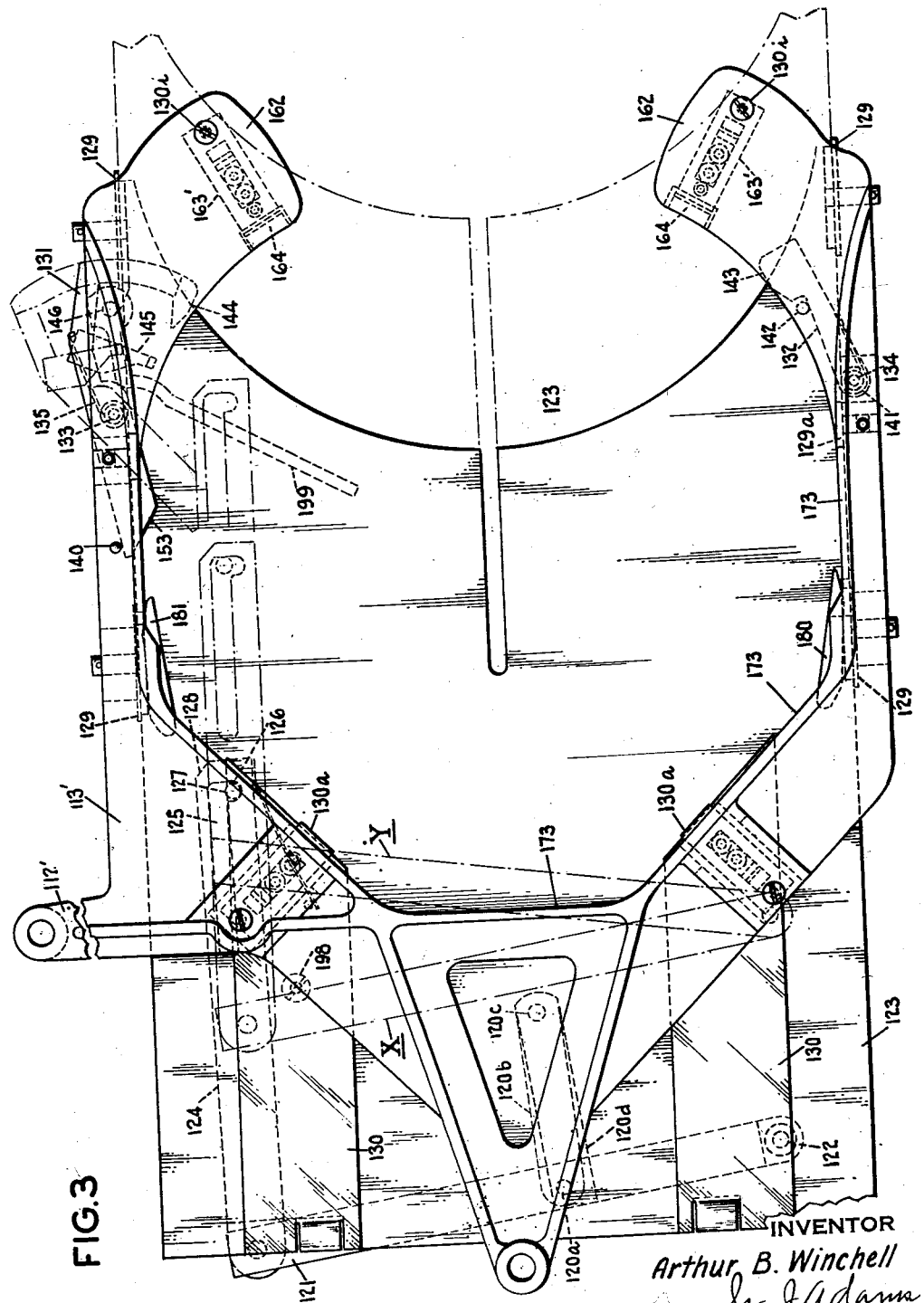
Fig. 3 is a plan view of the hopper and slide.

Top lever 118 has a hole in its outer end receiving a bolt 120 fitting in hole 120a of link 120b pivoted at 120c to the arm 120d fastened to the transverse lever 121 (Fig. 18). The transverse lever is pivoted at 122 to hopper slide 123 which is adapted to receive an assortment of phonograph records. The other end of lever 121 is pivoted to one end of regulating or compensating link 124. The other end of link 124 has a slot 125 leading at its outer end into a depression 126. Stud 127 passes through the slot or the depression, as the case may be, and is threaded into the slide 123. The link 124 positions arm 121 in respect to slide 123 in two different places. When the stud is at the right-hand end of slot 125, as shown in Fig. 3, arm 121 takes the position designated by X in that figure. When the stud rests on the opposite end of the slot 125 the lever 121 will take the position designated Y in Fig. 3.

The slide 123 moves in hopper casting 113' and rests on four flanged bottom rollers 129 and two top rollers 129a journalled in the hopper casting (Figs. 3 and 34).

The slide 123 has fastened to it two back plates 130 substantially the thickness of a single record and are adapted to engage the rear circumference of the bottom record to push it to the right under movement of the slide.

At each side of the hopper casting in the rear are located two back dogs identical in construction (Figs. 3 and 22). Each dog consists of a pawl 130a hinged to the hopper casting for limited movement up and down. They may be hinged in various ways but I have accomplished this by means of a clamp such as 130b (Fig. 21) which fits in a slot 130c and is bolted to the hopper frame 113' by screws 130d. Clamp 130b has a reversely bent end 130e fitting over a bar formed by the long slot 130c and a short slot 130f. As thus mounted, the dogs or pawls are normally retained with their bent-over ends 130g against or slightly above the slide 123 in front of the back plates 130. These back dogs make it unnecessary to mill the slot 130h to definitely small proportions to prevent a record from passing therein during the time the hopper is being filled. Since the downturned ends rest on the slide the records abut against these back dogs and there is no chance of a record being wedged against the slide and the casting 113' as the operator puts the records in the hopper. When the slide moves forward the slanting surface of the downturned ends 130g ride up on the back plates 130 which are also slightly bevelled. A set screw 130i adjustably limits the downward movement of the dogs.

To insure that the bottom record is properly centered against the rear centering wedges 130 a back center lever 131 and a front center lever 132 are pivoted in the hopper casting 113' at pivots 133 and 134 respectively. Lever 131 is urged clockwise by spring 135 coiled around pivot 133, one end of the spring resting against the forward end of the lever and the other one being secured in the flange 136 of a bushing fitting inside the coil and resting against flange 137 of the pivot stud. By turning flange 136 tension may be placed on this spring which tension may be used to hold the adjustment.

The left-hand end of lever 131 is forced by the spring against the stud pin 140 but the lever can be rotated counter-clockwise by the records in a way to be explained later.

Centering lever 132 is pivoted to the hopper casting 113' by means of a similar bolt, stud and spring arrangement generally indicated by 141. However, in this case the spring is wound in a left-hand direction so as to urge the lever 132 in counter-clockwise direction and against stop pin 142. The lever can be rotated clockwise against the tension of the spring by records on the slide when the slide is moved toward the turntable.

The location of stop pins 142 and 140 is such that the ends 143 and 144 of the centering levers will just clear the bottom record of small size, for example, a 10 inch record when it is properly centered on the slide against the back plates or centering wedges 130. As the slide moves to the right in Fig. 3 the centering levers 131 and 132 will push the small size bottom record into center position if it happens to be located at one side or the other. When a large size, for example, a 12 inch record, is at the bottom on slide 123 it will engage the ends 144 and 143 of the centering levers 131 and 132 as the slide is moved to the right in Fig. 3 and the record will be centered by seating it against the centering wedges 130. As soon as the large size record is centered against the wedges 130 it can yield no further and continued movement of slide 123 forces levers 131 and 132 to rotate in counter-clockwise and clockwise direction respectively (Fig. 3) against the tension of the coil springs.

Back centering lever 131 carries a projection 145 (Fig. 32) spot-welded or otherwise fastened thereto, or this projection may be an integral part thereof. A vertical shaft 146 is pivoted in the platform 44 (Fig. 5) and in the casting 113'. On this shaft is fastened the regulating lever 147 which extends upwards, thence horizontally back of the projection 145 and thence across under the slide 123. The lower part of the shaft 146 is bent horizontally at 146' at a certain angle shown in Fig. 1 and thence at a slight angle at 148, (see also Figs. 4 and 5). Above the part 148 is located bell crank 149 (similar to bell crank 192 of Fig. 27). The bell crank 149 is fastened to the platform 44 by strap 150 in which it is pivoted at 150a. In the hole 150b is fastened cable 61 secured at the other end to index lever 51. The hole 150b would serve no useful purpose in Fig. 27 so it is shown dotted therein to make it unnecessary to repeat the showing of the dog in a separate figure. When the record is being played and the slide 113' is retracted the regulating lever 147 is positioned about as shown in Fig. 4. The purpose of the regulator and connected parts will be given when the operation is described.

In Fig. 24 the details of the pick-up arm are shown. Pick-up arm 40 consists of a channel shaped bar and extends through a central opening in bracket 43. The rear end of this arm has a counter weight 151 pivoted to it at 152 but it is not sufficient to counter-balance the arm. Pivot 45 permits vertical movement of the pick-up arm. Horizontal movement of the pick-up arm takes place about the pivotal points 47 and 48 already referred to.

On top of the rear end of pick-up arm 40 is arranged a brake shoe 154 adapted to contact, when the needle has been lowered below the lever of the record, with another brake shoe 155 adjustably secured to the rear shelf 156 integrally secured to the bracket 43. When the turntable is lowered, as previously referred to, the pick-up 41 will descend until the two brake shoes are brought into contact and further movement is then prevented. As the pick-up arm is swung backward or forward in the record changing operation of the mechanism the braking surfaces will prevent overrunning of the arm and connected levers and thus hold them in the desired positions.

The adjusting stud 157 of the pick-up brake has a central hole through which passes a switch pin 158 adapted to rest on the braking surface 154 and to be moved upward against switch arm 159, when the pick-up 41 descends by the lowering of the turntable and record. This movement of the pick-up forces pin 158 to raise switch arm 159 and brake switch contacts 160 and make switch contacts 161. The purpose of these contacts will be referred to in a description of the operation of the machine.

To permit a warped record to pass between the slide 123 and the front part of the casting 113' or to insure that only one record will otherwise pass on to the table, I locate admitter dogs in each of the prongs 162 at the front of the hopper casting 113'. These admitters are identical and are shown in detail in Figs. 19, 20 and 21. The ends or prongs 162 have slots 163 to contain the pawl 163' having long and short slots like the pawl 130a in Fig. 23. The admitters are hinged similarly to the pawl 130a of Fig. 22 and their downward movement is limited by a similar set screw. The similar parts are therefore given similar reference characters. The admitter dog has a fibre block 164 secured to the upturned end adapted to engage the bottom record in the hopper; a spring 165 aids gravity in forcing this block downwards. The admitters are adjusted so as to be spaced from the slide the normal thickness of a record, or slightly less. The slanting surface will permit a warped record to elevate the admitters against the tension of the spring so it can pass therethrough but the second record will not be able to raise the dog as it is moved only by frictional force and not by the plates 130.

Figure 5:
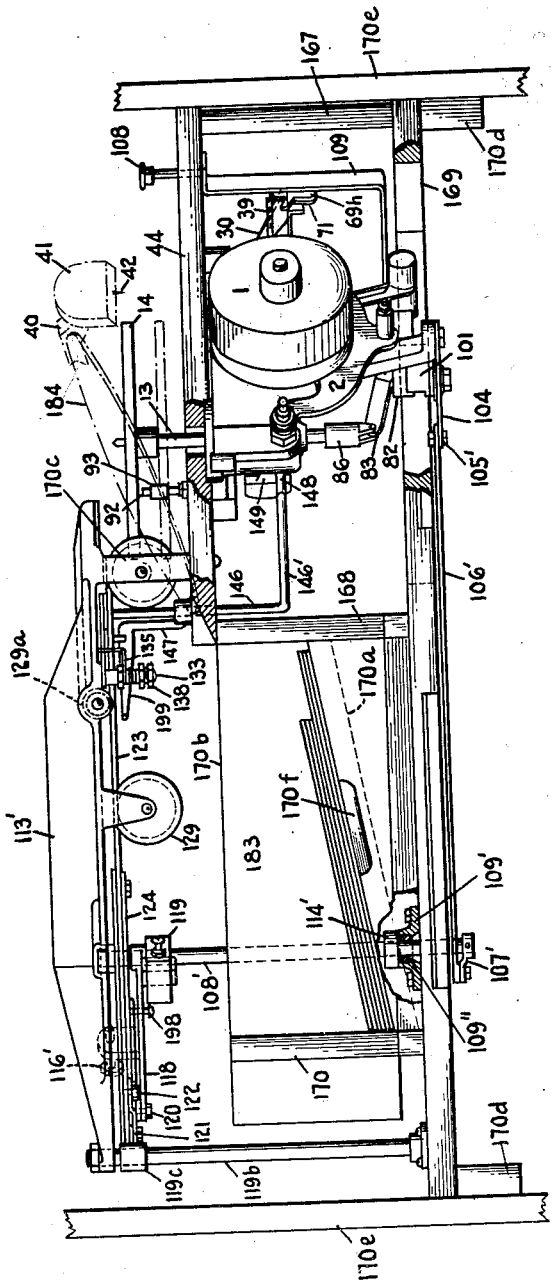
Fig. 5 is a front elevation of the hopper and motor mechanism attached to the removable chassis.

The various parts of the phonograph are secured to a chassis shown in Fig. 5. This chassis consists of a platform 44 to which the motor casting is fastened. This platform is joined to side pieces 167, 168, to which is secured the bottom part 169. These four members form a sort of box open at the front and back with the motor casting and other parts enclosed therein. The bottom member 169 extends beyond the side piece 168 and has secured thereto the side piece 170 spaced from the extreme left-hand end, as shown in Fig. 5. Above the member 169 is located the bottom 170a of the discard hopper. This bottom piece is slanted to some extent so that the records will slide down into the hopper as they are one by one discarded from the turntable 14. A back piece 170b closes the rear of this discard hopper.

The hopper casting 113' has two identical legs 170c (one only being visible in Fig. 5) bolted to the platform 44 and the other side of the casting is supported by the standard 119b which is bolted to the extreme left end of the bottom piece 169. The shaft 108' extends behind the back piece 170b.

It will be seen that the complete phonograph mechanism is fastened to the wooden chassis which has the ends of bottom 169 resting upon rails or ways 170d fastened to the cabinet sides 170e. The bottom 169 may be secured to these rails by appropriate screws or other fasteners (not shown).

Whenever it is necessary to service the phonograph mechanism the screws may be removed and the entire chassis pulled back out of the cabinet. A new chassis and mechanism, or the same one when repaired, may then be inserted in the cabinet. This chassis arrangement makes a rigid support for the phonograph parts and its ease of removal and insertion facilitates repairs and other service.

The bottom of the discard hopper 183 may have a small slot 170f to permit one to grasp from the front the records in the hopper whenever they are to be placed in the supply hopper of casting 113'.

As shown in Fig. 6, the turntable 14 has a felt cover 172 tucked around the skirt portion 172a and held in place by the split ring 172b. By manipulating the split ring the felt cover may be readily applied or removed.

The general construction of the phonograph having been disclosed, its operation will now be described. The user of the phonograph will place a plurality of records, either small size, large size, or any promiscuous arrangement of the two, in the hopper on top of slide 123. The walls surrounding the sides and back portion of the hopper leave ample room for the records so that they may be carelessly placed in the hopper and no accuracy is required in positioning them. The back dogs 130a close the slot between the slide and the casting 113' in the rear so that it is impossible to accidentally wedge a record therein by careless handling.

To start the instrument, push button 79 (Figs. 1, 13 and 29) will be depressed. This downward thrust will tilt lever 75 and raise it against the trip lever 39. The raising of the lever 39 removes the notch 37 from under the projection 36. As soon as this takes place lever 30 drops downward due to its own weight. This movement forces the abutment 32 on the rear end of this lever against the downwardly extending end 29 of the clutch lever 27 and forces the clutch members 21, 22 together. When the button was pushed the switches 80' and 81' was closed and the switch 79' opened (Fig. 29). This happened shortly before the trip lever 39 was operated or simultaneously therewith. The circuit may be traced from main 171, switch 179, coil 178, switch 81', junction point 175, back to main 177. Another circuit is closed from switch 179 through wire 172, contacts 80', coil 173, rheostat 174, wire 176, clutch switch 31', point 175, back to main 177. The motor now starts with heavy torque as the motor coils 173, 178 are in parallel. If the phonograph had been previously stopped when the record changing mechanism was in operation the pickup arm would have been down and a switch 161 would have been closed. This would have short-circuited rheostat 174 and increased the current in coil 173. Under such conditions it would require more torque to start the motor and the increased current would furnish it. Under either of the above conditions the motor is started and through clutch 21 and 22 rotates worm 23 and the index disk 26. It also rotates through the same worm, worm gear 12 and turntable 14. The rotation of disk 26 is permitted at this time because the closing of the clutch 21, 22, removed catch 58' (Figs. 1 and 7) from notch 59' in the disk. Index disk 26, shaft 25 and cam 82 (Fig. 6) commence to rotate under power of the motor. For a considerable portion of this initial rotation of disk 26 the stud 59 slides in groove 55 of link 51 producing no movement of the latter, except to rotate it about its pivot point 52. Rotation of the cam 82, however, causes roller 87 (Figs. 6 and 7) to drop to swing-back surface 89 of the cam, lowering the turntable to position II. This lowers the turntable and the record thereon beneath, and away from, the needle of the pickup arm, thus freeing the needle from the record so that it can be swung back.

Figure 27:
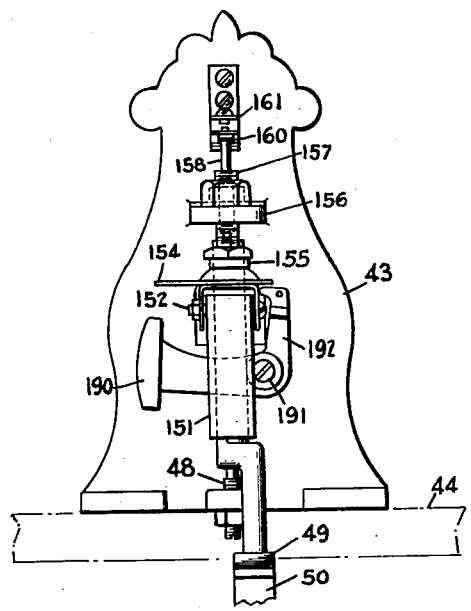
Fig. 27 is an elevation of the pickup bracket and associated parts.

As soon as the turntable and record were lowered the pickup arm 40 dropped slightly and brought the brake surfaces 154 and 155 together (Figs. 24 and 27). At the same time it pushed upward on rod 158, opened switch 160 and closed switch 161. The closing of switch 161 short-circuited the remaining portion 174 of the speed regulating rheostat and increased the torque. There is no utility in this, however, if the motor started, as has been supposed, from playing position of the turntable, but if the master switch 179 has been opened by the user and the phonograph stopped while it was changing the records the switch 161 would be closed on operation of button 79, and this would give maximum torque to the motor for starting when all of the apparatus was geared to it and imposing a maximum load at the start.

When the operator releases pressure on button 79 the spring 81 forces it back. This permits the trip 75 to drop back to normal position, closes switch 79' and opens switches 80' and 81'. This puts the motor coils in series and reduces the current consumption. At this time the motor is running and the heavy torque is no longer needed.

As cam 82 rotates, the roller 87 passes to the right in Fig. 7 over cam surface 89, the cam moving to the left. Assuming that the repeat lever is in the position shown in Fig. 15, the projection 97 as the cam rotates carries along driving arm 101 by contact with surface 100. The movement of arm 101, through stud 102', (Figs. 2 and 4) rotates arm 104 clockwise around its pivot 106. This latter movement through link 106' and arm 107' (Fig. 5) rotates shaft 108' and yoke 119. Through adjusting screws 117a this yoke engages the projection 119a beneath arm 118 (Fig. 28). This moves top lever arm 118 and transverse lever 121 connected thereto. At this time link 124 has its depression 126 engaging the stud 127 in the slide (Fig. 3). Lever 118 therefore is virtually pivoted to slide 123 at point 120 and the slide starts moving to the right. Up to the present time the starting of the motor and the closing of the motor clutch brought into rotation index disk 26, and lowered the turntable to the swing-back position II by means of the cam 82 and lift lever 83, and started the slide moving to the right in Figs. 3 and 4 through the coupling of the driving arm 101 to the cam.

Continued rotation of cam 82 beneath roller 87 brings the roller to the lowest surface 90 (Fig. 7). This drops the roller and lift lever and the connected turntable to the discard position III. This lowering of the turntable brings the back edge (Figs. 5 and 6) of the rotating record on the turntable into contact with rubber 92 of the discard stud 93, thus transferring the pivot point of the record from the receiving pin 13' to the rubber 92 in the discard stud.

The continued rotation of the turntable turns the record about the point 92 and thus rotates it off of the turntable and drops it into the discard hopper 183. Reference character 184 indicates in dotted lines the record as it is being slid into the hopper.

At about the time the turntable is lowered to discard position III stud 59 reaches the end of its travel in slot 55 and further rotation pushes link 51 to the right in Fig. 4. This movement of the link 51 swings pick-up lever arm 50 and pick-up arm 40 about the pivot points 47 and 48. This does two things. First, it swings the pickup away from the record so that the latter can be raised to receiving position, and second, the end of the horizontal portion 69a engages the slanting down-turned end 70 of throw-out lever 30 and causes that slanting surface to ride up on the flat surface 69a until the throw-out lever is raised to its normal position at which time notch 37 of the catch 39 engages the abutment 36 (Fig. 12). This movement of the throw-out lever 30 to its normal position places tension on spring 33 tending to pull the clutch lever 27 to the unlatched position. However, the clutch cannot return to the unlatched position at this time because upturned projection 58' is resting on the circumference of disk 26 and cannot move under the urge of the spring 33.

During all this time the slide 123 is traveling with the record to the right in Figs. 3 and 4 to position the record over the turntable. The cam 82 continues to rotate under the driving force of the motor until the roller 87 rides up the slanting surface to surface 91 on the cam. As the roller is pushed up this incline to the top surface, lift lever 83 raises the rotating shaft 13 and turntable 14 to the highest position IV. At this time the slide 123 has moved to the end of its travel to the right and as the turntable is brought into position IV the receiving pin 13' enters the center hole of the record. The turntable is held in this high position during all the time that the roller 87 on lift lever 83 is riding on surface 91 and during this time the movement of the roller on stud 102' along the arcuate return surface of slot 103' starts the slide on its return to the left. The slide will be withdrawn from under the record by the time the turntable is lowered by the roller descending to the swing-back surface 94 of the cam, thus bringing the turntable back to the swing-back position II with the record in place. During this time the rotation of disk 26 causes stud 59 to proceed first along the left-hand side of slot 55 and then along the right-hand side as the stud rotates through the last quarter of its revolution until it engages notch 57. Further rotation of disk 26 pulls inward on link 51 and swings pick-up arm lever 50 and the pick-up arm 40 back towards the turntable. During this swinging of the arm the throw-out lever 30 remains in latched position because it is held by engagement of notch 37 with abutment 36. As the cam and disk continue to rotate the pick-up arm is brought back to the normal playing position as is approximately shown in Figs. 1 and 2.

As the disk and cam continue to rotate stud 59 leaves detent 57 and travels down the right-hand surface of slot 55. During this time the rotation of the cam brings the surface 88 under roller 87 and raises the turntable back to playing position I. The bringing of the turntable up to the normal playing position engages the outer top surface of the record with the needle 42 of the pick-up. The pick-up arm is thus raised by engagement with the needle and switch operating rod 158 is lowered permitting the closing of switch 160 and opening of switch 161. The braking surfaces 154 and 155 separated at this time to permit free movement of the pick-up during the playing of the record.

The opening of switch 161 removes the short-circuit around the resistance 174 of the rheostat, and decreases the torque still further as the load is reduced. The closing of switch 160 establishes a sustaining circuit for the electric motor. Clutch switch 31' is opened shortly after switch 160 is closed by disk 26 rotating sufficiently to bring notch 59' opposite projection 58' on the clutch arm. As soon as this position is reached spring 33, placed under tension as previously described, snaps the clutch lever 27 down in Fig. 1 until projection 58' enters the notch 59'. This locks the disk and cam against further rotation and opens the clutch, disconnecting the motor from the record changing apparatus. It is preferable to so design the spring as to remove spring tension from the clutch at this time. The opening of clutch switch 31' is accomplished (Fig. 6) by engagement of projection 29' with switch arm 30'. The opening of clutch switch 31' does not stop the motor as it has the sustaining circuit through switch 160 on the pick-up arm. The record therefore continues to rotate with the needle on the edge thereof. While rotation of the record may pull the needle into the playing grooves in most cases, I prefer to use a weight 190 pivoted at 191 in the bracket 43 and having a projecting lever arm 192 engaging the rear side of the back end of the pick-up arm 40 in Fig. 24 to aid the arm in making its initial movement into the sound grooves. This weight is superior to a spring as it exerts constant force regardless of the position of the pick-up arm.

The motor is now unclutched from everything except the turntable. Disk 26, cam 82 and hopper slide 123 remain stationary. In this position the motor coils are in series and the rheostat is in circuit. The speed of the motor at this time may be adjusted by controlling the potential applied thereto through adjustment of the rheostat shown diagrammatically in Fig. 29. This adjustment when once made usually will be permanent though it may be adjusted by the user at any time.

The rotation of the record draws the needle around through the sound grooves and reproduces the sound through the electric pick-up 41 in ways well known in the art and since this forms no part of this invention, details of the pick-up and loud speaker are not illustrated, but it will be understood that the leads 193 from the pick-up will pass to vacuum tube amplifiers in the standard way.

As the needle travels around the sound groove the pick-up arm 40 is swung inwardly around the pivots 47 and 48 and at the end of the sound grooves the needle is brought into the discarding grooves at the center portion. At present there are two standard forms of grooves for rejecting records in automatic phonographs. One of these is shown in Fig. 25. Reference character 194 indicates the sound portion of the record. The end of the sound grooves lead into a spiral groove 195 which spiral brings about the discarding of the record. Figure 26 shows the other standard form which consists of a concentric circular groove 196 into which the end of the second sound groove leads.

If the record that has just been played contains the spiral discard groove 195 of Fig. 25 the pick-up arm and the attached lever 50 will be quickly moved inward in Fig. 1 until the projection 69j engages the wall 197 on trip lever 39. This raises the trip lever and removes the detent from the strip 36. This will permit throw-out lever 30 to drop through its own weight.

If the record being played has an eccentric circular groove 196 of Fig. 26 or any other form of irregular groove, the needle will first move the pickup arm inwardly and then outwardly as it follows this eccentric or irregular groove. As the record was being played the trip dogs 71 and 69h pivoted to the end of pick-up arm lever 50 and were pulled along the notched surface of catch 39 (Fig. 12). As the needle swings inwardly along the eccentric groove 196 the trip slide along underneath the notches in catch 39 as during the playing of the record, but when the needle swings back through movement of the other portions of the eccentric groove the lever 39 is raised by the dogs in the movement of the pick-up arm 50 in the back direction. The raising of the lever 39 and the catch 37 drops the throw-out lever, as has already been described. One of the dogs, say 69h is made slightly shorter than the other. Since they have the same pivot their engaging points are thus spaced slightly apart and furnish two means of tripping the lever. Either the one point or the other will be in engagement with a groove in the trip lever and a slight retrograde movement caused by the disk and grooves will trip the mechanism.

The dropping of this lever 30 brings about exactly the same action as when it was dropped by pushing the starting switch heretofore described. That is, it will throw the clutch into operative position and start the rotation of disk 26, cam 82 and slide 123 and bring about the discarding of the record and the playing of a new one thereon. The playing of the records and the discarding of the same will take place continuously until all of the records in the hopper have been played. When the last record has been played and there are no further records on the slide the discard and receiving operations will proceed as before described, but when the turntable is raised to its receiving position IV the slide will be moved over the table but it cannot place a record thereon. Therefore, as the table later is raised to playing position I there will be nothing to engage the needle in the pick-up arm and the latter will remain in the lowered position with switch 161 closed and switch 160 open. The sustaining circuit of the motor is therefore no longer closed through switch 160 and when the projection 58' of the clutch lever is snapped into depression 59' of disk 26 by tension of spring 33 clutch switch 31' is opened. There being no sustaining circuit, the motor stops. For further playing the user will remove the records from the discard hopper 183 and place them in the supply hopper on slide 123 in any order desired, and with any arrangement of large and small size records as before.

If at any time the user of the instrument is dissatisfied with a record being played, starting button 79 may be pressed which will trip catch 39 through lever 75 causing the throw-out lever 30 to drop, thus closing the clutch and clutch switch. This will stop the playing of that particular record, bring about its discard and place a new record on the turntable. This stopping of the playing of an undesired record may be accomplished at any part of the playing cycle.

If the user desires a record to be continuously played, push button 108 will be moved to the left in slot 108'' in platform or panel board 44, as shown in Fig. 1. This will move lever arm 109 to the left in Fig. 15 and push the trip 94' against the tension of spring 96, thus withdrawing the catch 97 from engagement with wall 100 of the arm 101. In this position when the playing of a record has been completed the disk 26 and cam 82 as well as the pick-up arm 40 and pick-up arm lever 50 will go through all the movements previously described except that roller 87 on lift lever 83 cannot drop down to the discard surface 90 (Fig. 7) because driving arm 101 remains stationary. The roller rides now on surface 116 of the driving arm and is prevented from dropping below that level. The cam therefore will rotate the depression 90 past roller 87 while the turntable will be maintained in the swing-back position II. The played record thus is not discarded because it has not been brought into contact with discard rubber 92. As the turntable is raised in the receiving position IV no record is placed thereon from the slide because the slide did not move as the driving arm 101 is stationary. When the turntable is finally brought back into playing position I the played record is on the table and it is played over again. This repeating of the record will continue indefinitely until the repeat button 108 is brought back to the normal position.

The foregoing operation has been described with the assumption that a small size, say 10 inch record, was placed from the slide to the turntable. If the bottom record in the hopper resting on the slide 123 happens to be a large size, say 12 inch record, the action will be as follows:

As the slide is moved to the right in Fig. 3 the point of application of the force to the slide will be definitely set at point 120 by engagement of stud 127 in depression 126 of link 124. The slide will therefore be moved to the right in the same way as if a 10 inch record were in place thereon until the large size record engages the inner ends 143 and 144 of centering levers 132 and 131. Movement of the slide will cause the large size record to be centered against the wedges 130 on the slide. After the record has been thus centered continued movement to the right will push the levers 131 and 132 outwardly. Movement of lever 132 has no further function, but movement of lever 131 brings cam surface 153 on the rear end into engagement with cam surface 128 on link 124. After this engagement takes place further movement of the slide to the right forces link 124 downward in Fig. 3 until stud 127 leaves depression 126 and enters slot 125. Movement of the slide 123 then discontinues until the driving operation brings the left-hand end of slot 125 of link 124 into engagement with stud 127. When this takes place there can be no further movement between lever 121 and the slide 123. Further movement of driving arm 118 therefore moves lever 121 and slide 123 together. This regulation is arranged to shorten the movement enough to bring the large size record over the turntable with its central hole in line with the receiving pin 13' as the table is raised to the elevated position IV.

Figure 32:
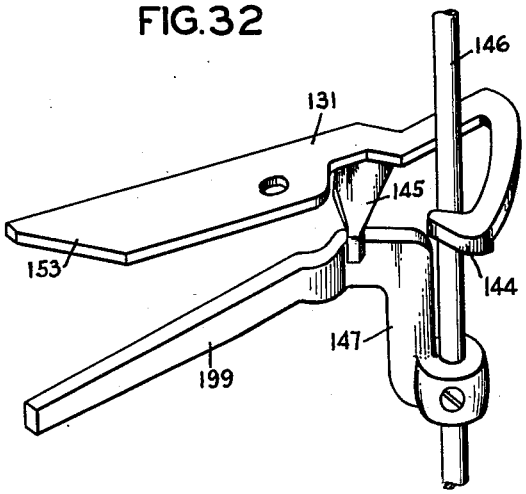
Fig. 32 is a perspective view of the back centering lever and the pickup regulating lever.

As the centering lever 131 moves counter-clockwise by engagement with the large size record, the projection 145 engages the arm 147 and rotates the shaft 146 clockwise (Figs. 1 and 32). The rotation of shaft 146 moves arm 148 from beneath the weighted arm 149 and permits it to turn about its pivot clockwise in Fig. 24. This pulls on cable 61 (Fig. 1), moves lever 51 over to the right in Fig. 1 and keeps the left-hand surface of slot 55 always in engagement with stud 59 as disk 26 rotates. This causes the stud 59 to enter depression 56 in the end of link 51 during the last quarter of its movement and since this is at a greater distance from pivot point 52 than depression 57, pick-up arm lever 50 and attached pick-up arm 40 are swung inwards towards the turntable a less amount. The notches 56 and 57 are so spaced in respect to the distance from pivot point 52 so as to bring about the positioning of the needle in the pick-up arm to the correct place for large and small size records. The record will be played and discarded as previously described. As the slide 123 moves to place another record on the turntable pin 198 thereon will engage the part 199 and move arm 147 and shaft 146, to move arm 148 under the bell crank 149, thus positioning it for a small record. If the next record happens to be a large one the slide 123 will move out a less distance, due to the sliding of pin 127 into slot 125, and the pin 198 would not move far enough to engage the arm 199. The adjustment previously made by centering lever 131 would thus remain for all large records immediately following each other. The adjustment by pin 98 is changed only when a small record moves forward on the slide.

If a large size record is on the turntable when the "repeat" button 108 is moved the pickup arm adjustment will stay set for a large size record as the slide 123 will not move as previously described. The pin 198 will therefore not move the arm 199 to the small record position. The pickup arm will therefore be properly positioned to repeat the playing of the large size record.

It has been found that when no preventive means are used the spring pressure against centering levers 131 and 132 occasionally snaps the large size record forward as the levers descend on the back circumference of the record during the latter movements thereof and thus pushes the record beyond to desired position over the turntable. To prevent this action it is preferable to use V-shaped cams 180 and 181. Just after the ends 143 and 144 of the centering levers pass the maximum travel they engage these V- shaped cams and are prevented from turning inwardly until they pass beyond the rear ends of the cams at which time they snap inwardly but at that time the large size record on slide 123 has moved to a position where the centering levers are out of contact with the record and the record thus remains in contact with the back surfaces 130 on the slide and its correct position has not been disturbed.

It will be noted that I do not use the rather delicate force of the needle to close the motor switch. I use such movements to operate a trip and the trip lever closes the clutch and motor switch by energy previously stored up by the movements of the motor itself. Likewise the energy from the motor is stored up in spring 33 to open the clutch and switch.

As the slide 123 is moved to place a record on the turntable the record passes under the admitter dogs while the other records are held back. If the bottom record is warped it will engage the slanting surface 166 of the admitters and push them up until the record can pass thereunder. Thus, warped records can be placed on the table without danger of admitting the immediately superposed record.

It will be understood that the phonograph apparatus described herein will be placed in any cabinet to suit the desires of the manufacturer or the public, but since the cabinet is no part of my invention I have shown only a few of the supporting pieces inside the cabinet to which the apparatus is attached. The automatic phonograph may be used alone in the cabinet or it may be incorporated in a cabinet with radio receiving apparatus where the same tubes may be used for audio amplification in radio reception and amplification of the pickup currents of the phonograph. Also, the same power rectifying and supply apparatus may be used for both phonograph and the radio set. Such a combination is described in the application of Stuart W. Seeley, Serial No. 398,078, filed October 5, 1929, but since it is no part of my invention I refer herein to the combination only in general terms.

While I have shown a particular arrangement of parts to perform the automatic action of the phonograph, it will be apparent that various modifications may be devised without departing from the spirit of the invention.

Having described my invention, what I claim is:

1. In phonographs, a turntable, a pickup, a connecting rod to move the pickup toward the turntable, a hopper adapted to contain records, a slide adapted to move a record from the hopper and place it on the turntable, centering wedges on said slide, an arm at one side of the hopper adapted to engage the edge of the record on the slide and force it between said wedges, and linkage between said arm and said rod to cause it to move the pickup either one of two distances to place the pickup at the beginning of the sound track on the record placed on the table by the slide.

2. In phonographs, a turntable, a pickup, a hopper adapted to contain records, a slide adapted to move a record from the hopper and place it on the turntable, centering wedges on said slide, arms at the side of said hopper adapted to engage the edge of the record and force it between said wedges on the slide as it is moved from the hopper, a linkage having two different effective lengths adapted to move the pickup arm toward the record and connections between said linkage and one of said arms.

3. In phonographs, a turntable, a hopper, a slide at the bottom of the hopper adapted to push a record from the hopper and deliver it to the table, and a movable stop spaced substantially the height of a normal record above the slide as it moves a record over the table, said stop having a slanting edge to enable a record of different height to raise the stop and pass therebeneath.

4. In phonographs, a turntable, a hopper, a slide at the bottom of the hopper adapted to push a record from the hopper and deliver it to the turntable, a pivoted lever spaced from the slide between the hopper and the turntable, means to adjustably establish the minimum space between the lever and slide, a head on said lever having a slanting surface adapted to be engaged by the edge of a warped record to cause the lever to increase the space and pass the record thereunder.

5. In phonographs, a hopper, a turntable, a cam, a lever contacting with said cam and connected at one end to said turntable for lowering it below playing position, a slide, a driving arm connected to said slide to push a record from the hopper and deliver it to the turntable, means for connecting the arm to the cam, and means independent of said lever for disconnecting the arm from the cam.

6. In phonographs, a hopper, a turntable, a cam connected to the turntable for raising and lowering it above and below the playing position, a slide, a driving arm connected to said slide to push a record from the hopper and deliver it to the turntable, a dog on said cam engaging said arm, a repeat lever pivoted adjacent said arm and having one end adapted to engage said dog to free the arm from the cam.

7. In phonographs, a motor, a turntable, a pickup arm, record changing apparatus, a clutch between the motor and the record changing apparatus, a trip for said clutch having a notched surface and an abutment, said arm having two independently movable pawls engaging the notches of said trip, and a projection on one of said pawls for engaging said abutment.

8. In phonographs, a motor, a turntable, a pickup arm, record changing apparatus, a clutch between the motor and the record changing apparatus, a pivoted trip for said clutch having a notched surface and a depending abutment, two independently movable pawls on said arm engaging the notches of said trip, one of said pawls engaging said notches at a different angle than the other and a projection on one of said pawls adapted to engage said abutment.

9. In phonographs, a motor, a turntable, a pickup arm, record changing apparatus, a clutch between the motor and the record changing apparatus, a pivoted trip lever for said clutch having notches on its under surface and a depending lug, a lever secured to the pickup arm and pivoted to swing beneath said trip lever, two independently movable pawls on said lever adapted to trail under said trip in engagement with said notches, one of said dogs engaging said notches at a different angle than the other, and a projection on one of said pawls adapted to engage said lug.

10. In phonographs, a motor, a turntable, a pickup arm, record changing apparatus, a clutch between the motor and the record changing apparatus, a trip lever for said clutch, a lever pivoted to the end of said pickup arm, a screw on the second mentioned lever, a pawl pivoted eccentrically on said screw adapted to engage and move said trip lever, and means to lock the screw at any angular position to position the pawl in respect to the trip lever.

11. In phonographs, a frame, a motor, a shaft attached to said turntable and having a step bearing, a cam, a lift lever pivoted at one end to said frame, a roller attached to the intermediate part of said lever and engaging said cam, a lever pivoted to the end of said lift lever and having one end engaging said step bearing, and screws between said levers to adjust the position of said step bearing in respect to the lift lever.

12. In phonographs, a turntable, a hopper, a slide at the bottom of the hopper adapted to push a record from the hopper to the turntable, an abutment on said slide adapted to engage the rear edges of the bottom record in the hopper when the slide moves therefrom, and a pawl pivoted to said hopper and positioned between the bottom record and said abutment in the retracted position of the slide.

13. In phonographs, a turntable, a hopper, a slide at the bottom of the hopper adapted to push a record from the hopper to the turntable, plates on said slide adapted to engage the rear edge of the bottom record in said hopper when the slide moves therefrom, and pawls pivoted to said hopper and having heads positioned between the rear edge of the record and said plates in the retracted position of the slide.

14. In phonographs, a turntable, a hopper, a slide at the bottom of the hopper adapted to push a record from the hopper to the turntable, plates on said slide adapted to engage the rear edge of the bottom record in said hopper when the slide moves therefrom, and pawls pivoted to said hopper and having heads positioned between the rear edge of the record and said plates in the retracted position of the slide, said heads having slanting rear edges to ride over said plates when the slide moves out of the hopper.

15. In phonographs, a turntable, a hopper, a slide at the bottom of the hopper adapted to push a record from the hopper and deliver it to the turntable, a gauge forming a space above the slide to admit a record moved thereby, said gauge having means to engage the edge of an abnormal record to be moved by the slide to increase said space to permit the record to pass therethrough.

ARTHUR B. WINCHELL.